(12) United States Patent
Katti et al.

(10) Patent No.: US 8,811,072 B2
(45) Date of Patent: Aug. 19, 2014

(54) MAGNETORESISTIVE RANDOM ACCESS MEMORY (MRAM) PACKAGE INCLUDING A MULTILAYER MAGNETIC SECURITY STRUCTURE

(75) Inventors: Romney R. Katti, Shorewood, MN (US); James L. Tucker, Clearwater, FL (US); Anuj Kohli, Apple Valley, MN (US)

(73) Assignee: Honeywell International Inc., Morristown, NJ (US)

( * ) Notice: Subject to any disclaimer, the term of this patent is extended or adjusted under 35 U.S.C. 154(b) by 72 days.

(21) Appl. No.: 13/419,109

(22) Filed: Mar. 13, 2012

(65) Prior Publication Data
US 2013/0241014 A1 Sep. 19, 2013

(51) Int. Cl.
*G11C 11/00* (2006.01)
*H01L 23/00* (2006.01)
*G11C 11/16* (2006.01)

(52) U.S. Cl.
CPC .............. *H01L 23/57* (2013.01); *H01L 23/573* (2013.01); *G11C 11/16* (2013.01); *G11C 11/1695* (2013.01)
USPC ........... 365/158; 365/173; 340/551; 340/541; 340/568.1; 257/433

(58) Field of Classification Search
CPC ...... H01L 23/57; H01L 23/573; G11C 11/16; G11C 11/1695
USPC ............... 365/158, 173; 340/551, 541, 568.1; 257/433
See application file for complete search history.

(56) References Cited

U.S. PATENT DOCUMENTS

| | | | |
|---|---|---|---|
| 5,902,690 A | 5/1999 | Tracy et al. | |
| 6,264,108 B1 * | 7/2001 | Baentsch | 235/487 |
| 6,914,805 B2 | 7/2005 | Witcraft et al. | |
| 7,005,733 B2 | 2/2006 | Kommerling et al. | |
| 7,180,008 B2 * | 2/2007 | Heitmann et al. | 174/261 |
| 7,224,634 B2 * | 5/2007 | Lenssen et al. | 365/228 |
| 7,468,664 B2 * | 12/2008 | Daughton et al. | 340/551 |
| 7,485,976 B2 | 2/2009 | Knudsen | |
| 7,489,015 B2 * | 2/2009 | Stobbs | 257/433 |
| 7,615,416 B1 * | 11/2009 | Chock | 438/127 |
| 7,685,438 B2 * | 3/2010 | Knudsen | 713/194 |
| 7,712,147 B2 * | 5/2010 | Lenssen et al. | 726/34 |
| 7,978,070 B2 * | 7/2011 | Hunter | 340/545.6 |
| 8,167,057 B2 * | 5/2012 | Gabelich | 173/194 |
| 8,172,140 B2 * | 5/2012 | Bartley et al. | 235/451 |
| 8,261,367 B2 * | 9/2012 | Lenssen et al. | 726/34 |
| 8,294,577 B2 * | 10/2012 | Deak | 340/568.1 |

(Continued)

OTHER PUBLICATIONS

"Philips Self-Destructing MRAM on the Way", downloadable from http://www.bizasia.com/technology_/de8a4/philips_self destructing_mram.htm, 2 pages, dowloaded on Sep. 8, 2011.
Response to the Office Action dated Jun. 21, 2013 from related U.S. Appl. No. 13/419,066, filed Sep. 20, 2013, 7 pages.
Office Action from U.S. Appl. No. 13/419,066, dated Jun. 21, 2013, 8 pp.

(Continued)

*Primary Examiner* — Viet Q Nguyen
(74) *Attorney, Agent, or Firm* — Shumaker & Sieffert, P.A.

(57) ABSTRACT

A magnetoresistive random access memory (MRAM) package may include an MRAM die, a package defining a cavity and an exterior surface, and a magnetic security structure disposed within the cavity or on the exterior surface of the package. The MRAM die may be disposed in the cavity of the package, and the magnetic security structure may include at least three layers including a permanent magnetic layer and a soft magnetic layer.

30 Claims, 8 Drawing Sheets

(56) References Cited

U.S. PATENT DOCUMENTS

| | | |
|---|---|---|
| 2004/0032010 A1 | 2/2004 | Kools et al. |
| 2008/0247098 A1 | 10/2008 | Deak |
| 2010/0050275 A1 | 2/2010 | Burch et al. |
| 2010/0110783 A1 | 5/2010 | Liu et al. |

OTHER PUBLICATIONS

Office Action from U.S. Appl. No. 13/419,066, dated Jan. 30, 2014, 4 pp.

Response to Office Action mailed Jan. 30, 2014, from U.S. Appl. No. 13/419,066, filed Apr. 17, 2014, 3 pp.

* cited by examiner

US 8,811,072 B2

MAGNETORESISTIVE RANDOM ACCESS MEMORY (MRAM) PACKAGE INCLUDING A MULTILAYER MAGNETIC SECURITY STRUCTURE

TECHNICAL FIELD

The disclosure relates to magnetoresistive random access memory (MRAM), and, more particularly, to anti-tampering devices for MRAM.

BACKGROUND

MRAM is a non-volatile memory technology in which data are stored using magnetic domains. Because MRAM is non-volatile, the data stored in the magnetic domains is maintained without requiring power to continually refresh the magnetic domains. Additionally, MRAM may provide desirable read speeds, write speeds, and device longevity. Because of these characteristics, MRAM may be used in a variety of applications, such as long-term storage (e.g., in place of or as a complement to a hard disc drive or a solid state drive), or device memory (e.g., in place of or as a complement to dynamic random access memory (DRAM) and/or static random access memory (SRAM)).

SUMMARY

In general, the disclosure is directed to techniques and MRAM devices for reducing or substantially preventing tampering with the MRAM devices. In some examples, the MRAM device may be an MRAM die or an MRAM package. The MRAM die or MRAM package may include a magnetic security structure that includes at least three layers. At least one of the layers may include a permanent magnetic layer and at least one of the layers may include a keeper (or soft) magnetic layer. When the soft magnetic layer is intact (e.g., not damaged), the soft magnetic layer may channel magnetic flux from the permanent magnetic layer. This may prevent the magnetic flux from the permanent magnetic layer from influencing the magnetic orientations of free magnetic layers in MRAM cells in the MRAM die. However, when the soft magnetic layer is damaged, such as when the MRAM die is tampered with, the soft magnetic layer may not channel magnetic flux from the permanent magnetic layer, and the magnetic flux may affect magnetic orientations of free magnetic layers in MRAM cells in the MRAM die. The magnetic flux from the permanent magnetic layer may modify the magnetic orientation of free magnetic layers in at least some MRAM cells, thus changing the data stored on the MRAM die, and, in some cases, effectively erasing the data stored by MRAM die.

In one aspect, the disclosure is directed to an MRAM package that includes an MRAM die and a package defining a cavity and an exterior surface. The MRAM die may be disposed in the cavity. In accordance with this aspect of the disclosure, the package includes a magnetic security structure that includes at least three layers including a permanent magnetic layer and a soft magnetic layer.

In another aspect, the disclosure is directed to a semiconductor wafer that includes a plurality of MRAM dice and a magnetic security structure attached to a surface of the semiconductor wafer. According to this aspect of the disclosure, the magnetic security structure may include at least three layers including a permanent magnetic layer and a soft magnetic layer.

In a further aspect, the disclosure is directed to a method that includes forming a plurality of MRAM dice in a semiconductor wafer, where each of the plurality of MRAM dice includes a plurality of MRAM cells. The method also may include attaching a magnetic security structure to a surface of the semiconductor wafer over the plurality of MRAM dice. In accordance with this aspect of the disclosure, the magnetic security structure may include at least three layers including at least one permanent magnetic layer and at least one soft magnetic layer.

The details of one or more examples are set forth in the accompanying drawings and the description below. Other features, objects, and advantages will be apparent from the description and drawings, and from the claims.

DETAILED DESCRIPTION

In general, the disclosure is directed to techniques and MRAM devices for reducing or substantially preventing tampering with the MRAM devices. In some examples, an MRAM device may include a MRAM die enclosed in an MRAM package. The MRAM package may include a magnetic security structure disposed inside the MRAM package (e.g., attached to the package or the MRAM die), outside the MRAM package, or both. The magnetic security structure may include at least three layers. At least one of the layers may include a permanent magnetic layer and at least one of the layers may include a keeper (or soft) magnetic layer. When the soft magnetic layer is intact (e.g., not damaged), the soft magnetic layer may channel magnetic flux from the permanent magnetic layer. This may prevent the magnetic flux from the permanent magnetic layer from influencing the magnetic orientations of free magnetic layers in MRAM cells in the MRAM die. However, when the soft magnetic layer is damaged, such as when the MRAM die is tampered with, the soft magnetic layer may not channel magnetic flux from the permanent magnetic layer, and the magnetic flux may affect magnetic orientations of free magnetic layers in MRAM cells in the MRAM die. Damaging the soft magnetic layer may include, for example, removing at least part of the soft magnetic layer, marring the soft magnetic layer, tearing the soft magnetic layer, puncturing the soft magnetic layer, or otherwise changing physical or magnetic properties of the soft magnetic layer.

When the soft magnetic layer is damaged, the magnetic flux from the permanent magnetic layer may modify the magnetic orientation of free magnetic layers in at least some MRAM cells, thus changing the data stored on the MRAM die. By changing the data stored on the MRAM die, access to the original data (e.g., data stored on the MRAM die before tampering) may be made more difficult or may be prevented. Protection of data stored by the MRAM die in with the magnetic security structure in this manner may be useful if, for example, the MRAM die stores confidential information, such as classified information to which access is restricted by law or regulation to particular groups of persons, or other intellectual property of an individual or entity.

In other examples, the MRAM device may include an MRAM die that includes a magnetic security structure attached to a surface of the MRAM die. The magnetic security structure may include at least three layers, including at least one permanent magnetic layer and at least one soft magnetic layer. In some examples, as part of the manufacture of the MRAM die including the magnetic security structure, a semiconductor wafer including a plurality of (connected) MRAM dice may be fabricated. A magnetic security structure may be attached to a surface of the semiconductor wafer prior to cutting the semiconductor wafer into a plurality of discrete MRAM dice.

Figure 1:
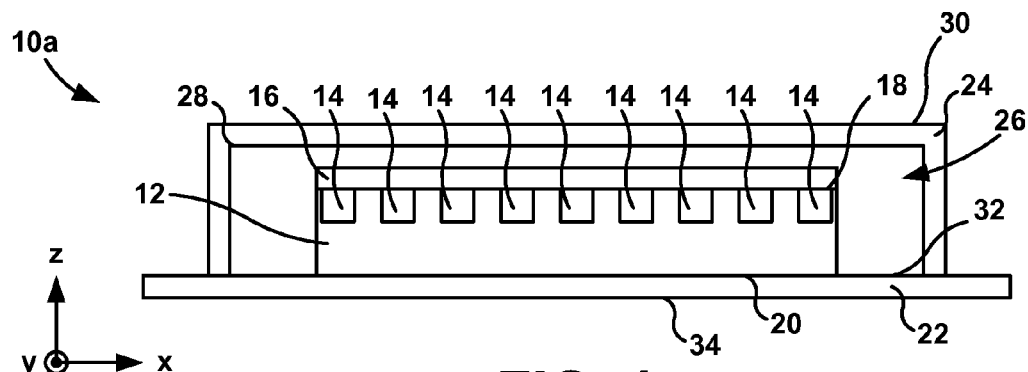
FIG. 1 is a conceptual diagram that illustrates a schematic cross-sectional view of an example MRAM package that includes a magnetic security structure.

FIG. 1 is a conceptual and schematic diagram that illustrates a cross-sectional view of an example MRAM package 10a in accordance with aspects of the disclosure. MRAM package 10a includes a substrate 22 and a cover 24. Together, substrate 22 and cover 24 define a cavity 26. Disposed in cavity 26 is an MRAM die 12. In some examples, substrate 22 and cover 24 define a substantially fully enclosed cavity 26 (e.g., fully enclosed or nearly fully enclosed). In other examples, substrate 22 and cover 24 may define a partially enclosed cavity 26. In some examples in which substrate 22 and cover 24 define a substantially fully enclosed cavity 26, substrate 22 and cover 24 may form a hermetic enclosure around MRAM die 12.

Substrate 22 may be formed of any of a variety of materials, such as a metal or alloy, a ceramic, or a plastic. For example, substrate 22 may be formed of alumina ($Al_2O_3$), aluminum nitride (AlN), beryllium oxide (BeO), or the like. In some examples, substrate 22 may include at least one electrical trace extending between an internal surface 32 of substrate 22 and an external surface 34 of substrate 22. The at least one electrical trace may be electrically coupled to electrical circuitry of MRAM die 12 using, for example, a ball grid array, wire bonds, or the like. In this way, the at least one electrical trace may facilitate electrical communication between MRAM die 12 and circuitry outside of MRAM package 10a.

Cover 24 may define an internal surface 28 and an external surface 30. Cover 24 also may be formed of any of a variety of materials, such as a metal or alloy, a ceramic, or a plastic. For example, cover 24 may be formed of alumina ($Al_2O_3$), aluminum nitride (AlN), beryllium oxide (BeO), or the like.

MRAM package 10a also includes MRAM die 12 disposed within package 10a, e.g., in cavity 26. MRAM die 12 may be mechanically and electrically connected to substrate 22. For example, electrically conductive pads (not shown) on bottom surface 20 of MRAM die 12 may be soldered to electrically conductive pads (not shown) on internal surface 32 of substrate 22. As another example, bottom surface 20 of MRAM die 12 may be adhered to internal surface 32 of substrate 22 using an adhesive and electrically conductive pads (not shown) on top surface 18 of MRAM die 12 may be wire bonded to electrically conductive pads (not shown) on internal surface 32 of substrate 22.

MRAM die 12 includes a plurality of MRAM cells 14. Although FIG. 1 shows only one cross-sectional view of MRAM die 12, and, hence, show MRAM cells 14 extending along one direction (e.g., the x-axis shown in FIG. 1), MRAM die 12 may include a two- or three-dimensional array of MRAM cells 14 (e.g., MRAM cells 14 may be arrayed in a two-dimensional layer parallel to the x-y plane shown in FIG. 1).

MRAM cells 14 are the individual structures that are configured to store data magnetically in MRAM die 12. For example, each of MRAM cells 14 may include a fixed magnetic layer, a tunnel barrier layer, and a free magnetic layer (shown in, e.g., FIG. 2A). An orientation of the magnetic moment of the fixed magnetic layer is fixed at the temperatures and external magnetic fields in which MRAM die 12 is designed for use. The orientation of the magnetic moment of the free magnetic layer may be switched by between two states, each state representing a bit (e.g., a 0 or 1).

Figure 2A:
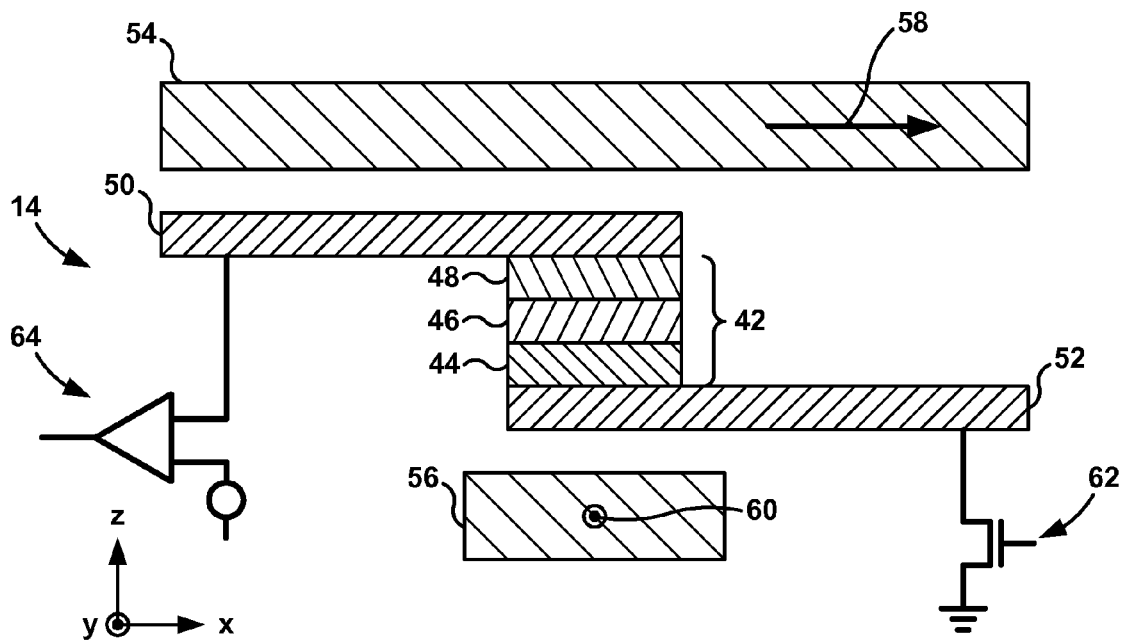
FIGS. 2A-2C are conceptual diagrams that illustrate an example MRAM cell.
Figure 2B:
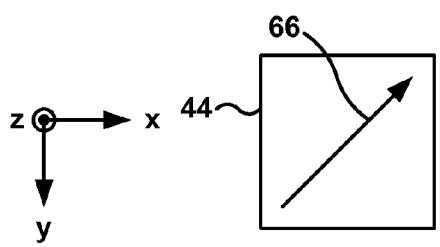
Figure 2C:
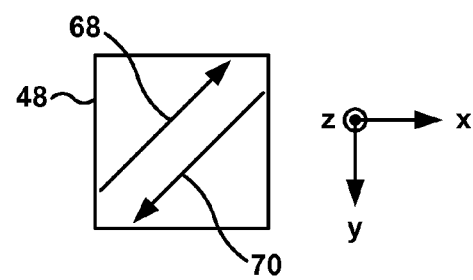

FIGS. 2A-2C are conceptual cross-sectional diagrams that illustrate an example of an MRAM cell 14. In some implementations, as shown in FIGS. 2A-2C, MRAM cell 14 may include a first write line 54 and a second write line 56, which are used to write data to MRAM cell 14. First write line 54 extends generally in the x-axis direction of FIG. 2A, while second write line 56 extends generally in the y-axis direction of FIG. 2A. MRAM cell 14 also includes a magnetic stack 42, which includes a free magnetic layer 48, a tunnel barrier layer 46, and a fixed magnetic layer 44. In some examples, magnetic stack 42 may be referred to as a magnetic tunnel junction (MTJ).

Tunnel barrier layer 46 may include a dielectric, such as an oxide. In some examples, tunnel barrier layer 46 may include aluminum oxide ($Al_2O_3$) or magnesium oxide (MgO).

Fixed magnetic layer 44 includes a pinned magnetic moment 66, illustrated in FIG. 2B. In the illustrated example, pinned magnetic moment 66 is oriented at an approximately 45 degree angle to first write line 54 and second write line 56 (e.g., approximately a 45 degree angle to both the x-axis and y-axis in FIG. 2B, where orthogonal x-y-z axes are shown in the figures for ease of description). In some examples, fixed magnetic layer 44 may include a ferromagnetic metal or alloy, such as, for example, nickel (Ni), iron (Fe), or cobalt (Co), or alloys of Ni, Fe, or Co. Example alloys from which fixed magnetic layer 44 can be formed include nickel iron (NiFe), cobalt iron (CoFe), and nickel iron cobalt (NiFeCo). In some examples, fixed magnetic layer 44 may be magnetically coupled to an antiferromagnetic layer, which acts to pin the magnetic moment 66 of fixed magnetic layer. The antiferromagnetic layer may include an antiferromagnetic alloy, such as, for example, iron manganese (FeMn), nickel manganese (NiMn), platinum manganese (PtMn), or iridium manganese (IrMn). In some examples, the antiferromagnetic layer may be a bilayer or multilayer, in which the layers have different compositions or magnetic properties.

Free magnetic layer 48 includes a free magnetic moment that is free to rotate under influence of a sufficiently strong applied magnetic field, as illustrated in FIG. 2C. In some examples, free magnetic layer 48 may include a ferromagnetic metal or alloy, such as, for example, Ni, Fe, or Co, or alloys of Ni, Fe, or Co. Example alloys from which free magnetic layer 48 can be formed include NiFe, CoFe, and NiFeCo.

For example, free magnetic layer 48 may have a first free magnetic moment 68 or a second free magnetic moment 70. Free magnetic layer 48 may be switched between first free magnetic moment 68 and a second free magnetic moment 70 by a sufficiently strong magnetic field, such as a magnetic field generated by first write line 54 and second write line 56 or a magnetic field generated by a magnetic security device 16 (e.g., by a permanent magnet layer of magnetic security device 16).

For example, the magnetic moment of free magnetic layer 48 may be switched between first free magnetic moment 68 and a second free magnetic moment 70 using first write line 54 and second write line 56. An applied magnetic field may be produced by pulses of electric current flowing through first write line 54 and second write line 56. Consider an example in which the free magnetic moment of layer 48 begins with the orientation of first free magnetic moment 68. Electric current may be sent through first write line 54 in the direction indicated by arrow 58 (e.g., in the direction of the x-axis of FIG. 2A) and the magnetic moment of free magnetic layer 48 may rotate to be substantially parallel to arrow 58. While electric current still flows through first write line 54, current may be sent through second write line 56 in a direction indicated by arrow 60 (e.g., in the direction of the y-axis of FIG. 2A, out of the plane FIG. 2A), bringing the free magnetic moment to a substantially 45 degree angle between arrows 58 and 60. Current flow through first write line 58 is then ceased, and the free magnetic moment of free magnetic layer 48 rotates to be substantially parallel to the direction of current flow through second write line 56, indicated by arrow 60. Finally, current flow through second write line 56 is ceased, and the free magnetic moment of free magnetic layer 48 rotates to be oriented in the direction indicated by second free magnetic moment 70.

The orientation of free magnetic moment 68, 70 relative to the orientation of pinned magnetic moment 66 determines the resistance of magnetic stack 42. For example, the resistance of magnetic stack 42 when pinned magnetic moment 66 and second free magnetic moment 70 are oriented substantially anti-parallel is greater than the resistance of magnetic stack 42 when pinned magnetic moment 66 and first free magnetic moment 68 are oriented substantially parallel. The relative resistance of the magnetic stack 42 may be determined by flowing current from transistor 62 through bottom electrode 52 to magnetic stack 42, through top electrode 50 to op-amp 64, where the current is compared to a baseline or standard current. The relative resistance is the storage mechanism of MRAM cells 14. For example, a high resistance may correspond to a logical state of "1," while a low resistance may correspond to a logical state of "0."

Figure 3:
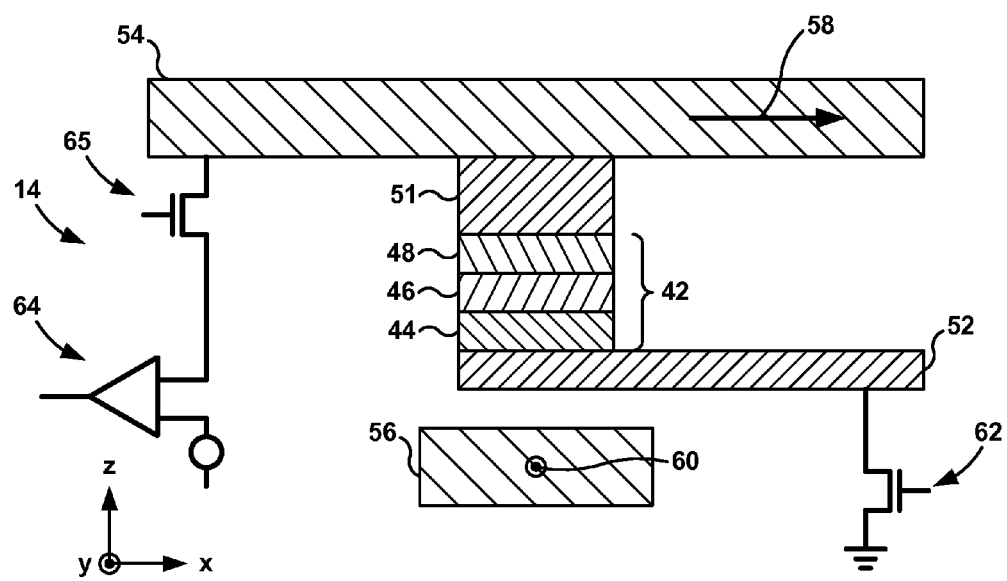
FIG. 3 is a conceptual and schematic diagram that illustrates another example MRAM cell.

FIG. 3 is a conceptual and schematic cross-sectional diagram of another example configuration of MRAM cells 14. The configuration shown in FIG. 3 is similar to the configuration of MRAM cell 14 in FIG. 2A. However, unlike MRAM cell 14 shown in FIG. 2A, MRAM cell 14 shown in FIG. 3 does not include top electrode 52 directly connected to op-amp 64. Instead, a top electrode 51 is electrically connected between first write line 54 and magnetic stack 42. First write line 54 is then electrically connected to a transistor 65, which is electrically connected to op-amp 64. When writing to MRAM cell 14 (e.g., controlling an orientation of magnetic the free magnetic moment of free magnetic layer 48), transistor 65 and transistor 62 may be in an open state, such that op-amp 64 and magnetic stack 42 are isolated from the current flowing through first write line 54. However, when reading the state of MRAM cell 14, the transistors 62 and 65 may be in closed states so current flows from a voltage source, through transistor 62, through bottom electrode 52, through magnetic stack 42, through first write line 54, through transistor 65, and to op-amp 64.

Figure 4:
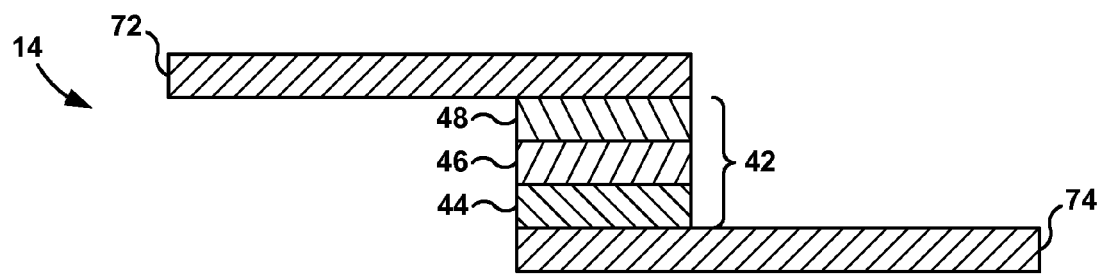
FIG. 4 is a conceptual and schematic diagram that illustrates another example MRAM cell.

FIG. 4 is a conceptual and schematic cross-sectional diagram of another example configuration of MRAM cells 14. In the example illustrated in FIG. 4, MRAM cell 14 is a spin-transfer torque (STT)-MRAM cell. Similar to the example shown in FIGS. 2A-2C, the example MRAM cell 14 shown in FIG. 4 includes a magnetic stack 42 comprising a fixed magnetic layer 44, a tunnel barrier layer 46, and a free magnetic layer 48. The magnetic moment of fixed magnetic layer 44 may be substantially fixed at temperatures and magnetic fields in which MRAM cell 14 will be used. The magnetic moment of free magnetic layer 48 is oriented using spin-oriented current that is directed through magnetic stack 42 using first write line 72 and second write line 74. In some examples, the magnetic moment of free magnetic layer 48 may be switched using the spin-oriented current between two, substantially antiparallel states, similar to the configuration in FIGS. 2A-2C. Similar to the example shown in FIGS. 2A-2C, the orientation of the magnetic moment of free magnetic layer 48 relative to the orientation of the magnetic moment of fixed magnetic layer 44 may be determined by measuring the resistance of magnetic stack 42. In some examples, first write line 72 and second write line 74 also serve as conduction paths for the process of reading data from MRAM cell 14 (e.g., measuring the resistance of magnetic stack 42). In other examples, MRAM cell 14 may include another conductive pathway electrically connected to magnetic stack for facilitating reading data from MRAM cell 14.

Figure 5:
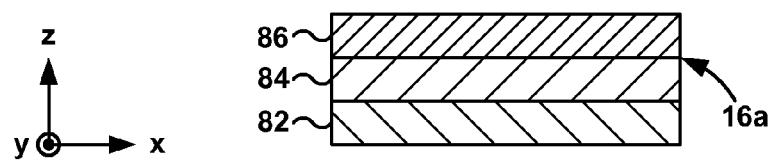
FIG. 5 is a conceptual and schematic cross-sectional diagram of an example magnetic security structure that includes at least three layers.

Returning to FIG. 1, MRAM package 10a also includes at least one magnetic security structure 16 disposed adjacent to (e.g., near) MRAM die 12. For example, FIG. 1 illustrates an example magnetic security structure 16 that is attached (e.g., directly attached) to a top surface 18 of MRAM die 12. FIG. 5 is a conceptual and schematic cross-sectional diagram that illustrates further detail of one example of a magnetic security structure 16a. As shown in FIG. 5, magnetic security structure 16a includes at least three layers. At least one of the layers may be a soft magnetic layer 86 and at least one of the layers may be a permanent magnetic layer 84. In some examples, magnetic security structure 16a may additionally include at least one adhesive layer 82 and/or at least one spacer layer (described with respect to FIG. 9).

In some examples, permanent magnetic layer 84 may be disposed between soft magnetic layer 86 and MRAM cells 14. In some implementations, this may result in the soft magnetic layer 86 being disposed nearer an exterior of MRAM package 10a than permanent magnetic layer 84. This may increase a likelihood of soft magnetic layer 86 being damaged by tampering with package 10a prior to permanent magnetic layer 84 being damaged or moved away from MRAM die 12, thus increasing the likelihood that magnetic flux from permanent magnetic layer 84 will affect an orientation of the free magnetic moment of free magnetic layer 48 in at least some of MRAM cells 14 in response to tampering with package 10a. In other examples, soft magnetic layer 86 may be disposed closer to MRAM cells 14 than the permanent magnetic layer 84.

Permanent magnetic layer 84 may be formed of any permanent magnetic material, such as, for example, ferrite, alnico (a combination of aluminum, nickel, cobalt, iron, and, optionally, copper), or a rare earth magnetic material, such as samarium-cobalt or neodymium-iron-boron. Permanent magnetic layer 84 may be formed of a material and with a structure that causes permanent magnetic layer 84 to have a sufficiently high coercivity at use temperatures of MRAM package 10a so that the magnetic moment of permanent magnetic layer 84 is substantially stable, e.g., does not fluctuate due to thermal energy of permanent magnetic layer 84.

In some examples, permanent magnetic layer 84 may define a thickness greater than about 0.1 nanometers (nm). For example, permanent magnetic layer 84 may define a thickness between about 0.1 nm and about 5 millimeters (mm), between about 0.1 nm and about 10 micrometers (μm), or between about 100 μm and about 1 mm. In some examples, permanent magnetic layer 84 may be formed as a foil and adhered to adjacent layers (e.g., soft magnetic layer 86). In other examples, permanent magnetic layer 84 may be deposited using a thin film deposition technique, such as sputtering, ion beam deposition (IBD), physical vapor deposition (PVD), or chemical vapor deposition (CVD).

Soft magnetic layer 86 may be formed of any soft magnetic material, such as permalloy (Fe:80Ni or Fe:78Ni), silicon iron (Fe:4Si), nickel, iron, or the like. Soft magnetic layer 86 may be formed of a material and with a structure that causes soft magnetic layer 86 to have a sufficiently low coercivity at use temperatures of MRAM package 10a so that the magnetic moment of soft magnetic layer 86 changes under influence of a magnetic field generated by permanent magnetic layer 84.

In some examples, soft magnetic layer 86 may define a thickness greater than about 0.1 nanometers (nm). For example, soft magnetic layer 86 may define a thickness between about 0.1 nm and about 5 millimeters (mm), between about 0.1 nm and about 10 micrometers (μm), or between about 100 μm and about 1 mm. In some examples, soft magnetic layer 86 may be formed as a foil and adhered to adjacent layers (e.g., permanent magnetic layer 84). In other examples, soft magnetic layer 86 may be deposited using a thin film deposition technique, such as sputtering, ion beam deposition (IBD), physical vapor deposition (PVD), or chemical vapor deposition (CVD).

In some examples, the composition and configuration of permanent magnetic layer 84 and soft magnetic layer 86 may be selected so that soft magnetic layer 86 is near magnetic saturation when soft magnetic layer 86 is substantially intact (e.g., not damaged). When soft magnetic layer 86 is near magnetic saturation, the relative permeability of soft magnetic layer 86 may be near one (1), e.g., near the relative permeability of a non-magnetic material or a magnetically saturated magnetic material. Stated another way, when soft magnetic layer 86 is near magnetic saturation, the relative permeability of soft magnetic layer 86 may be much less than the relative permeability of an unsaturated soft magnetic material, e.g., much less than about 1,000. For example, when soft magnetic layer 86 is near magnetic saturation, the relative permeability of soft magnetic layer 54 may be less than about 10.

When the permeability of soft magnetic layer 86 is near one, magnetic security structure 16 may not significantly interfere with operation of MRAM cells 14 when soft magnetic layer 86 is substantially intact, e.g., is not damaged. For example, when the permeability of soft magnetic layer 86 is near one, magnetic security structure 16a may not significantly interfere with writing of data to MRAM cells 14 by controlling orientation of the magnetic moment of free magnetic layer 48 using first write line 54 and second write line 56.

Hence, in normal operation, e.g., when soft magnetic layer 86 is substantially intact, magnetic security device 16a may not interfere with operation of MRAM cells 14. However, if soft magnetic layer 86 is damaged, e.g., due to physical tampering with MRAM package 10a and/or MRAM die 12, a free magnetic layer 48 of at least some of MRAM cells 14 may be exposed to magnetic flux from permanent magnetic layer 84.

In some examples, the magnetic moment of permanent magnetic layer 84 may be configured (e.g., oriented relative to free magnetic layer 48 and sufficiently strong at the location of free magnetic layer 48) so that exposure of free magnetic layer 48 to magnetic flux from permanent magnetic layer 84 causes the magnetic moment of free magnetic layer 48 to be substantially aligned with the magnetic moment of permanent magnetic layer 84. For example, the magnetic moment of permanent magnetic layer 84 may be oriented in a direction parallel to first free magnetic moment 68 or a second free magnetic moment 70 (FIG. 2C). When the orientation of the magnetic moment of free magnetic layer 48 prior to being exposed to magnetic flux from permanent magnetic layer 84 is different than the magnetic moment of permanent magnetic layer 84, exposure of free magnetic layer 48 to magnetic flux from permanent magnetic layer 84 may cause the magnetic moment of free magnetic layer 48 to change, thus changing the value of the bit stored by the respective MRAM cell 14. On the other hand, when the orientation of the magnetic moment of free magnetic layer 48 prior to being exposed to magnetic flux from permanent magnetic layer 84 is substantially the same as the magnetic moment of permanent magnetic layer 84, exposure of free magnetic layer 48 to magnetic flux from permanent magnetic layer 84 may not cause the magnetic moment of free magnetic layer 48 to change.

When a plurality of MRAM cells 14 in MRAM die 10a are located sufficiently near to magnetic security structure 16 to that the magnetic field of permanent magnetic layer 84 affects the free magnetic layer 48 of the respective MRAM cells 14 when magnetic soft layer 86 is damaged, the orientation of at least some of the magnetic moments in the respective free magnetic layers 48 will be changed, rendering the data stored in the MRAM die 12 different than before tampering, which may effectively erase the data stored by MRAM die 12 in some examples. In some instances, the orientation of at least some of the magnetic moments in the respective magnetic free layers 28 will be changed within nanoseconds (e.g., less than 10 nanoseconds) of the soft magnetic layer 54 being tampered with. Changing the data stored by MRAM die 12 in response to tampering with magnetic security structure 14 may hinder access to the data and reverse engineering of the contents of the MRAM die 10. In this way, magnetic security structure 14 may help prevent tampering with the MRAM package 10 in which the structure 14 is incorporated, e.g., by helping to prevent access to data stored by the MRAM die 12.

In some examples, magnetic security structure 16a includes at least one layer in addition to permanent magnetic layer 84 and soft magnetic layer 86. The at least one additional layer may provide at least one of a variety of properties to magnetic security structure 16a. For example, magnetic security structure 16a shown in FIG. 5 includes an adhesive layer 82. Adhesive layer 82 may be disposed on a surface of permanent magnetic layer 84, as shown in FIG. 5. In other examples, adhesive layer 82 may be disposed between permanent magnetic layer 84 and soft magnetic layer 86 and/or on a surface of soft magnetic layer 86, in addition to or instead of being disposed on the surface of permanent magnetic layer 84.

Adhesive layer 82 may be formed of any suitable adhesive material. For example, adhesive layer 82 may include a pressure sensitive adhesive, such as a silicone- or acrylic-based pressure sensitive adhesive; a reactive adhesive, such as an epoxy, acrylic, acrylate, epoxy-acrylate, or urethane reactive adhesive; a heat- or UV-curable adhesive; or a thermoplastic adhesive that is applied in a melt form and cooled to solidify.

In the example shown in FIG. 5, adhesive layer 82 may be configured to adhere magnetic security structure 16a to top surface 18 of MRAM die 12 (FIG. 1). In some examples, adhesive layer 82 may provide a sufficiently strong bond between permanent magnetic layer 84 and MRAM die 12 that a person attempting to remove magnetic security structure 16 from MRAM die 12 is likely to damage soft magnetic layer 86 prior to successfully removing magnetic security structure 16a from die 12.

In some examples, adhesive layer 82 may be disposed between permanent magnetic layer 84 and soft magnetic layer 86 in addition to or instead of being disposed between magnetic security structure 16a and the die 12 or package 10a to which magnetic security structure 16a is attached. For example, permanent magnetic layer 84 and soft magnetic layer 86 may be formed of sheets of material and adhesive layer 82 may adhere permanent magnetic layer 84 and soft magnetic layer 86. In these examples, adhesive layer 82 between permanent magnetic layer 84 and soft magnetic layer 86 may be configured to provide a bond between permanent magnetic layer 84 and soft magnetic layer 86 that is weaker than the bond between magnetic security structure 16a and die 12 or package 10a, such that a person attempting to remove magnetic security structure 16a from MRAM die 12 or package is likely to damage soft magnetic layer 86 or separate soft magnetic layer 86 from permanent magnetic layer 84 prior to separating permanent magnetic layer 84 from the die 12 or package 10a.

Figure 6:
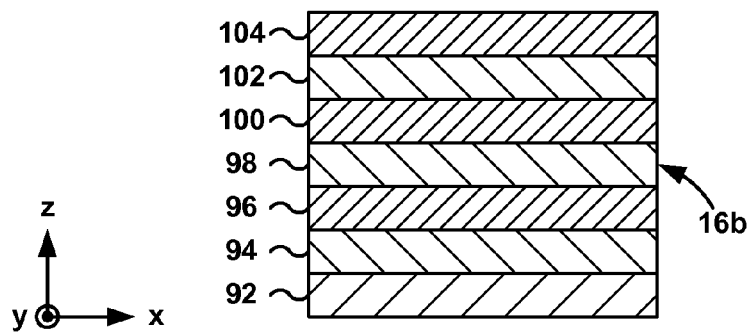
FIG. 6 is a conceptual and schematic cross-sectional diagram of an example magnetic security structure that includes a plurality of soft magnetic layers.

FIG. 6 is a conceptual and schematic cross-sectional diagram that illustrates magnetic security structure 16b, which may be an example of magnetic security structure 16 of FIG. 1. In the example of FIG. 6, magnetic security structure 16b includes a permanent magnetic layer 92, a first adhesive layer 94, a first soft magnetic layer 96, a second adhesive layer 98, a second soft magnetic layer 100, a third adhesive layer 102, and a third soft magnetic layer 104. The respective adhesive layers 94, 98, 102 adhere adjacent layers to each other, e.g., permanent magnetic layer 92 and first soft magnetic layer 96, first soft magnetic layer 96 and second soft magnetic layer 100, and second soft magnetic layer 100 and third soft magnetic layer 104, respectively. Each of adhesive layers 94, 98, 102 may include a composition similar to or substantially the same as adhesive layer 82 described with respect to FIG. 5. In some examples, each of adhesive layers 94, 98, 102 includes a similar composition, while in other examples, at least one of adhesive layers 94, 98, 102 includes a composition different from at least another of adhesive layer 94, 98, 102.

Permanent magnetic layer 92 may be similar to or substantially the same as permanent magnetic layer 84 described with reference to FIG. 5, e.g., with respect to both the composition and thickness of permanent magnetic layer 92.

Similarly, each of first soft magnetic layer 96, second soft magnetic layer 100, and third soft magnetic layer 104 may be similar to or substantially the same as soft magnetic layer 86 of FIG. 5, in one or both of composition and thickness. In some examples, each of first soft magnetic layer 96, second soft magnetic layer 100, and third soft magnetic layer 104 includes substantially the same composition, while in other examples, at least one of first soft magnetic layer 96, second soft magnetic layer 100, and third soft magnetic layer 104 may include a different composition than at least one other of first soft magnetic layer 96, second soft magnetic layer 100, and third soft magnetic layer 104. Similarly, the thicknesses of first soft magnetic layer 96, second soft magnetic layer 100, and third soft magnetic layer 104 may be similar or different.

In some examples, the plurality (e.g., at least two) of soft magnetic layers 96, 100, 104 may take the place of a single, thicker soft magnetic layer, e.g., may provide the same function within magnetic security structure 16b as a single, thicker soft magnetic layer. The "thickness" of the layer may be measured in the z-axis direction in the example shown in FIG. 6. For example, soft magnetic layers 96, 100, 104 may provide similar magnetic properties as a single layer of approximately equal thickness (approximately equal to the total thickness of layers 96, 100, 104 together). The soft magnetic layers 96, 100, 104 may work together to channel magnetic flux from permanent magnetic layer 92. Thus, soft magnetic layers 96, 100, 104 may each be required to remain substantially intact in order to prevent the magnetic flux from permanent magnetic layer 92 from influencing the magnetic orientations of free magnetic layers in MRAM cells 14 in the MRAM die 12.

In some examples, a plurality of soft magnetic layers 96, 100, 104 adhered together may provide a more cost-effective solution than a single, thicker soft magnetic layer. Additionally or alternatively, a plurality of soft magnetic layers 96, 100, 104 may allow use of different compositions for each layer 96, 100, 104, which may provide design flexibility and may allow tailoring of the magnetic properties of magnetic security structure 16b. In some examples, a plurality of soft magnetic layers 96, 100, 104 also may complicate removal of magnetic security structure 16b compared to a magnetic security structure that includes only one soft magnetic layer. Although FIG. 6 illustrates a magnetic security structure 16b that includes three soft magnetic layers 96, 100, 104, a magnetic security structure 16 may include one soft magnetic layer or a plurality of soft magnetic layers (e.g., at least two).

Figure 7:
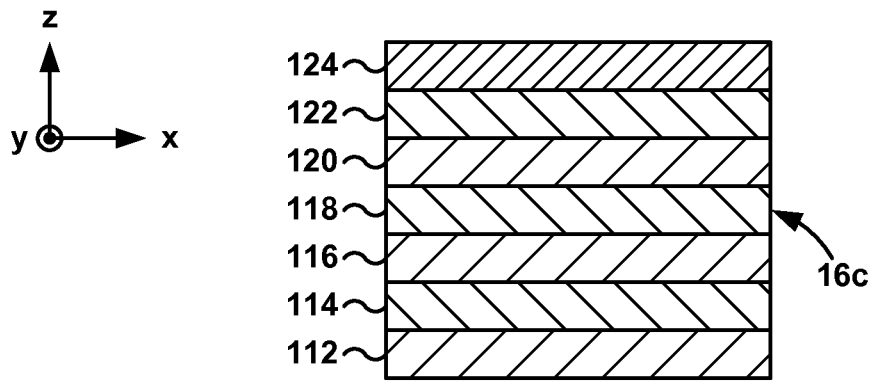
FIG. 7 is a conceptual and schematic cross-sectional diagram of an example magnetic security structure that includes a plurality of permanent magnetic layers.

FIG. 7 is a conceptual and schematic cross-sectional diagram that illustrates another example magnetic security structure 16c, which may be another example of magnetic security structure 16 (FIG. 1). Magnetic security structure 16c includes a first permanent magnetic layer 112, a second permanent magnetic layer 116, a third permanent magnetic layer 120, and a soft magnetic layer 124. Magnetic security structure 16c also includes a first adhesive layer 114 that adheres first permanent magnetic layer 112 and second permanent magnetic layer 116, a second adhesive layer 118 that adheres second permanent magnetic layer 116 and third permanent magnetic layer 120, and a third adhesive layer 122 that adheres third permanent magnetic layer 120 and soft magnetic layer 124.

Each of adhesive layers 114, 118, 122 may include a composition similar to or substantially the same as adhesive layer 82 described with respect to FIG. 5. In some examples, each of adhesive layers 114, 118, 122 includes a similar composition, while in other examples, at least one of adhesive layers 114, 118, 122 includes a composition different from at least another of adhesive layer 114, 118, 122.

Soft magnetic layer 124 may be similar to or substantially the same as soft magnetic layer 86 described with reference to FIG. 5, e.g., with respect to both the composition and thickness of soft magnetic layer 124.

Similarly, each of first permanent magnetic layer 112, second permanent magnetic layer 116, and third permanent magnetic layer 120 may be similar to or substantially the same as permanent magnetic layer 84 of FIG. 5, in one or both of composition and thickness. In some examples, each of first permanent magnetic layer 112, second permanent magnetic layer 116, and third permanent magnetic layer 120 includes substantially the same composition, while in other examples, at least one of first permanent magnetic layer 112, second permanent magnetic layer 116, and third permanent magnetic layer 120 may include a different composition than at least one other of first permanent magnetic layer 112, second permanent magnetic layer 116, and third permanent magnetic layer 120. Similarly, the thicknesses of first permanent magnetic layer 112, second permanent magnetic layer 116, and third permanent magnetic layer 120 may be similar or different.

In some examples, the plurality (e.g., at least two) of permanent magnetic layers 112, 116, 120 may take the place of a single, thicker soft magnetic layer. For example, permanent magnetic layers 112, 116, 120 may provide similar magnetic properties as a single layer of approximately equal thickness. In some examples, a plurality of permanent magnetic layers 112, 116, 120 adhered together may provide a more cost-effective solution than a single, thicker permanent magnetic layer. Additionally or alternatively, a plurality of permanent magnetic layers 112, 116, 120 may allow use of different compositions for each layer 112, 116, 120, which may provide design flexibility and may allow tailoring of the magnetic properties of magnetic security structure 16c. For example, the strength of the magnetic flux from permanent magnetic layers of structure 16c may be tailored to the specific application of structure 16c (e.g., the location at which magnetic security structure 16c is placed relative to MRAM cells 14) by increasing or decreasing the number of permanent magnet layers of structure 16c. Although FIG. 7 illustrates a magnetic security structure 16c that includes three permanent magnetic layers 112, 116, 120, a magnetic security structure 16 may include one permanent magnetic layer or a plurality of permanent magnetic layers (e.g., at least two).

Figure 8:
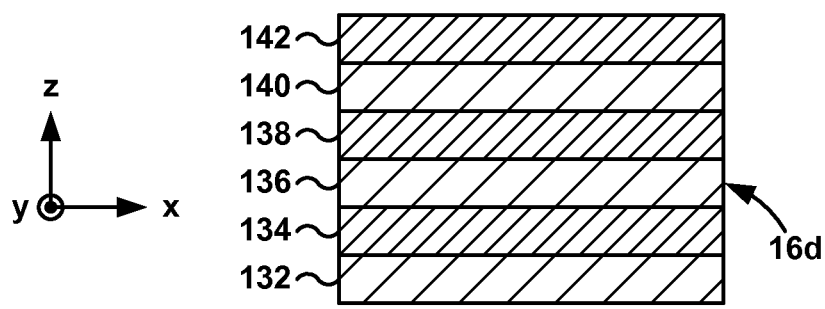
FIG. 8 is a conceptual and schematic cross-sectional diagram of an example magnetic security structure that includes a plurality of soft magnetic layers interleaved with a plurality of permanent magnetic layers.

In some examples, a magnetic security structure 16 may include a plurality of permanent magnetic layers and a plurality of soft magnetic layers. For example, as shown in shown in the conceptual and schematic cross-sectional diagram of FIG. 8, a magnetic security structure 16d may include a first permanent magnetic layer 132, a second permanent magnetic layer 136, and a third permanent magnetic layer 140. Magnetic security structure 16d also includes a first soft magnetic layer 134, a second soft magnetic layer 138, and a third soft magnetic layer 142. In the example shown in FIG. 8, the permanent magnetic layers 132, 136, and 140 are interleaved with the soft magnetic layers 134, 138, and 142. In other examples, a magnetic security structure 16 may include a plurality of permanent magnetic layers 132, 136, 140 disposed on one side of a plurality of soft magnetic layers 134, 138, 142 (e.g., the permanent magnetic layers 132, 136, 140 may not be interleaved with the soft magnetic layers 134, 138, 142).

Each of first permanent magnetic layer 132, second permanent magnetic layer 136, and third permanent magnetic layer 140 may be similar to or substantially the same as permanent magnetic layer 84 of FIG. 5, in one or both of composition and thickness. In some examples, each of first permanent magnetic layer 132, second permanent magnetic layer 136, and third permanent magnetic layer 140 includes substantially the same composition, while in other examples, at least one of first permanent magnetic layer 132, second permanent magnetic layer 136, and third permanent magnetic layer 140 may include a different composition than at least one other of first permanent magnetic layer 132, second permanent magnetic layer 136, and third permanent magnetic layer 140. Similarly, the thicknesses of first permanent magnetic layer 132, second permanent magnetic layer 136, and third permanent magnetic layer 140 may be similar or different.

Similarly, each of first soft magnetic layer 134, second soft magnetic layer 138, and third soft magnetic layer 142 may be similar to or substantially the same as soft magnetic layer 86 of FIG. 5, in one or both of composition and thickness. In some examples, each of first soft magnetic layer 134, second soft magnetic layer 138, and third soft magnetic layer 142 includes substantially the same composition, while in other examples, at least one of first soft magnetic layer 134, second soft magnetic layer 138, and third soft magnetic layer 142 may include a different composition than at least one other of first soft magnetic layer 134, second soft magnetic layer 138, and third soft magnetic layer 142. Similarly, the thicknesses of first soft magnetic layer 134, second soft magnetic layer 138, and third soft magnetic layer 142 may be similar or different.

In some examples, adjacent layers of magnetic security structure 16d may be mechanically coupled using an adhesive, e.g., adhesive layer 82 shown in FIG. 5. In other examples, adjacent layers of magnetic security structure 16d may be directly connected. For example, first soft magnetic layer 134 may be formed directly on first permanent magnetic layer 132, using, for example, chemical vapor deposition, welding, or the like.

Figure 9:
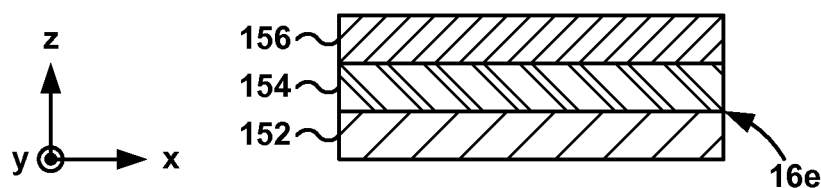
FIG. 9 is a conceptual and schematic cross-sectional diagram of an example magnetic security structure that includes a spacer layer between a soft magnetic layer and permanent magnetic layer.

In other examples, as shown in FIG. 9, another example magnetic security structure 16e may include a spacer layer 154 between a permanent magnetic layer 152 and a soft magnetic layer 156. Permanent magnetic layer 152 may be similar to or substantially the same as permanent magnetic layer 84 in thickness and/or composition. Soft magnetic layer 156 may be similar to or substantially the same as soft magnetic layer 86 in thickness and/or composition.

Spacer layer 154 may be formed of any of a wide range of materials, including substantially nonmagnetic materials. For example, spacer layer 154 may include aluminum, copper, silicon dioxide ($SiO_2$), silicon nitride (e.g., SiN, $Si_3N_4$, or $Si_2N_3$), or the like. Spacer layer 154 may provide distance between soft magnetic layer 156 and permanent magnetic layer 152, which may affect magnetic properties of magnetic security structure 16e. In this way, including spacer layer 154 or not including spacer layer 154 may result in magnetic security structures 16 with different magnetic properties. In addition, spacer layer 154 may add geometric variety to magnetic security structure 16e that may further complicate tampering with the MRAM package 10 including the magnetic security structure 16e. For example, adding spacer layer 154 and changing the number, size and arrangement of spacer layers 154 in different magnetic security structures of the MRAM may help reduce the predictability of the type of magnetic security structure 16 in a particular MRAM package 10, which may reduce the possibility of successful retrieval of data from MRAM die 12 of the MRAM package 10.

In some examples, different configurations of magnetic security structures 16 may be used adjacent to different location of MRAM die 12. For example, one configuration of a magnetic security structure 16 may be used adjacent to some MRAM cells 14 and a second configuration of magnetic security structure 16 may be used adjacent to other MRAM cells 14. The configuration of magnetic security structures 16 may be varied in one direction (e.g., in the x-axis direction), or in more than one direction (e.g., in two or all three of the x-, y-, and z-axis directions). Variation of magnetic security structures 16 throughout an MRAM package 10a (FIG. 1) may make successful tampering with MRAM package 10a more difficult by providing variation in the disassembly process that must be used to remove the magnetic security structure 16 from MRAM package 10a without affecting MRAM cells 14 (e.g., the orientation of the magnetic moment of free magnetic layer 48 in at least one of MRAM cells 14) to recover data stored by MRAM cells 14.

Figure 10:
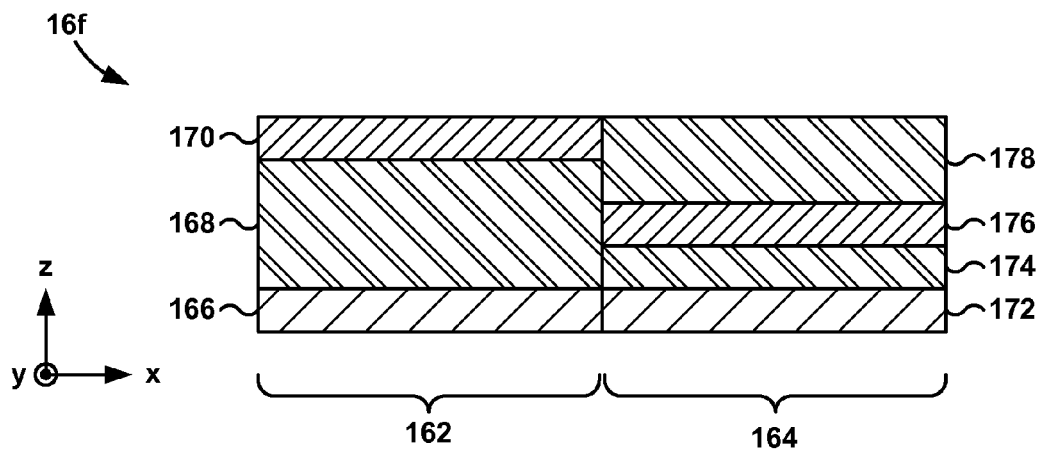
FIG. 10 is a conceptual and schematic cross-sectional diagram of an example magnetic security structure that includes a first structure in a first portion and a second structure in a second portion.

FIG. 10 is a conceptual and schematic cross-sectional diagram of another example of magnetic security structure 16 (FIG. 1). In particular, FIG. 10 illustrates magnetic security structure 16f that includes a first structural configuration 162 in a first portion of magnetic security structure 16f and a second, different structural configuration 164 in a second portion 164 of magnetic security structure 16f. First and second portions 162, 164, respectively, are directly adjacent each other in the x-y plane in the example shown in FIG. 10. In the example shown in FIG. 10, the first structural configuration 162 includes a first permanent magnetic layer 166, a first spacer layer 168, and a first soft magnetic layer 170. The second structural configuration 164 includes a second permanent magnetic layer 172, a second spacer layer 174, a second soft magnetic layer 176, and a third spacer layer 178. Permanent magnetic layers 166 and 172 may include compositions and/or thicknesses similar to permanent magnetic layer 84 shown in FIG. 5. Permanent magnetic layers 166 and 172 may include similar or different compositions and/or thicknesses. Similarly, soft magnetic layers 170 and 176 may include compositions and/or thicknesses similar to soft magnetic layer 86 shown in FIG. 5. Soft magnetic layers 170 and 176 may include similar or different compositions and/or thicknesses.

First spacer layer 168 provides spacing between first permanent magnetic layer 166 and first soft magnetic layer 170. In some examples, first spacer layer 168 contributes to the overall thickness of first structural configuration 162 to give first structural configuration 162 substantially the same thickness as second structural configuration 164. First spacer layer 168 may include a composition and/or thickness similar to or substantially the same as spacer layer 154 described with reference to FIG. 9.

In the example shown in FIG. 10, second spacer layer 174 provides spacing between second permanent magnetic layer 172 and second soft magnetic layer 176. Third spacer layer 178 contributes to the overall thickness of second structural configuration 164 to give second structural configuration 164 substantially the same thickness as first structural configuration 162. Second spacer layer 174 and/or third spacer layer 178 may include compositions and/or thicknesses similar to or substantially the same as spacer layer 154 described with reference to FIG. 9. In some examples, first spacer layer 168, second spacer layer 174, and/or third spacer layer 178 may have similar or substantially the same compositions and/or thicknesses as at least one of first spacer layer 168, second spacer layer 174, and/or third spacer layer 178. In other examples, at least one of first spacer layer 168, second spacer layer 174, and/or third spacer layer 178 may have a different composition and/or thickness than at least one other of first spacer layer 168, second spacer layer 174, and/or third spacer layer 178.

Although FIG. 10 illustrates one example of a magnetic security structure 16f that includes different structural configurations in two locations, other structural configurations may be used in a magnetic security structure 16f that includes different structural configurations in at least two locations. For example, the structural configurations may be selected from any of the structural configurations illustrated in FIGS. 5-10 or other structural configurations apparent to one of ordinary skill in the art based on this disclosure. Additionally or alternatively, magnetic security structure 16f may include more than two different structural configurations, e.g., at least two different structural configurations.

In some implementations, a magnetic security structure 16f that includes at least two structural configurations may hinder tampering with an MRAM package (e.g., MRAM package 10a of FIG. 1) and successful retrieval of data stored by the MRAM die of the MRAM package in which magnetic security structure 16f is used. For example, an intruder attempting to tamper with the MRAM package may not realize that at least two structural configurations are used in the magnetic security structure 16f and may inadvertently damage the soft magnetic layer (e.g., first soft magnetic layer 170) in at least one portion of magnetic security structure 16f as the intruder is attempting to remove permanent magnet 172 from the MRAM package because the intruder is unaware of the different location of the soft magnetic layer within magnetic security structure 16f. In this way a magnetic security structure 16f may increase a likelihood that the tampering results in at least some of the data stored in the MRAM die (e.g., MRAM die 12) is modified before the intruder can access the data stored in the MRAM die.

Figure 11:
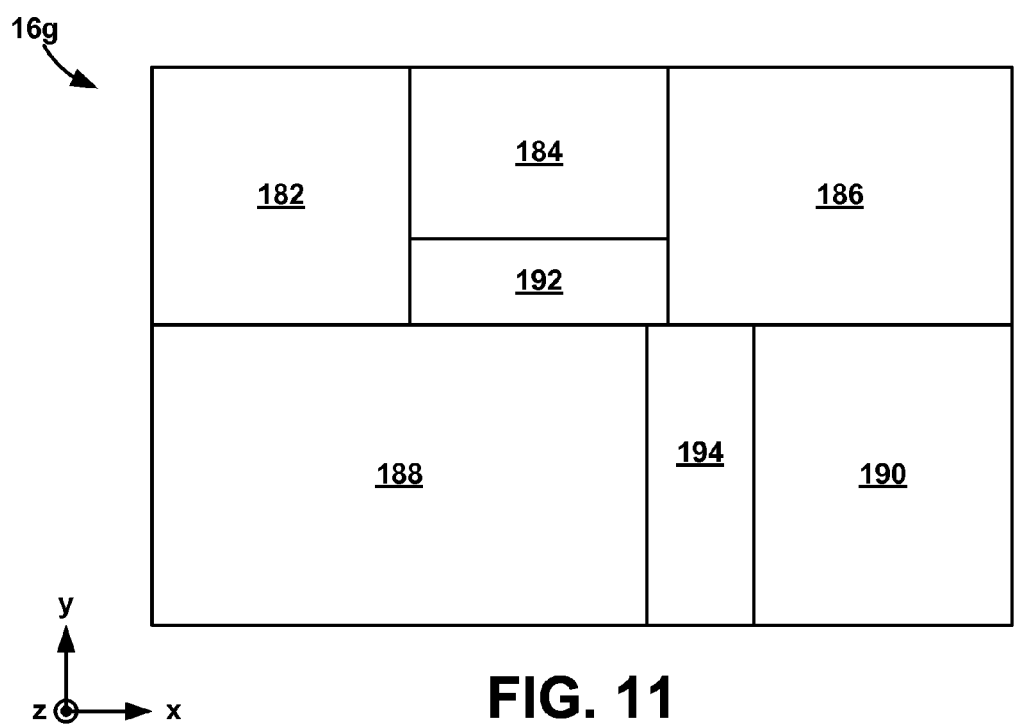
FIG. 11 is a conceptual and schematic diagram of an example magnetic security structure that includes a discontinuous structure.
Figure 12:
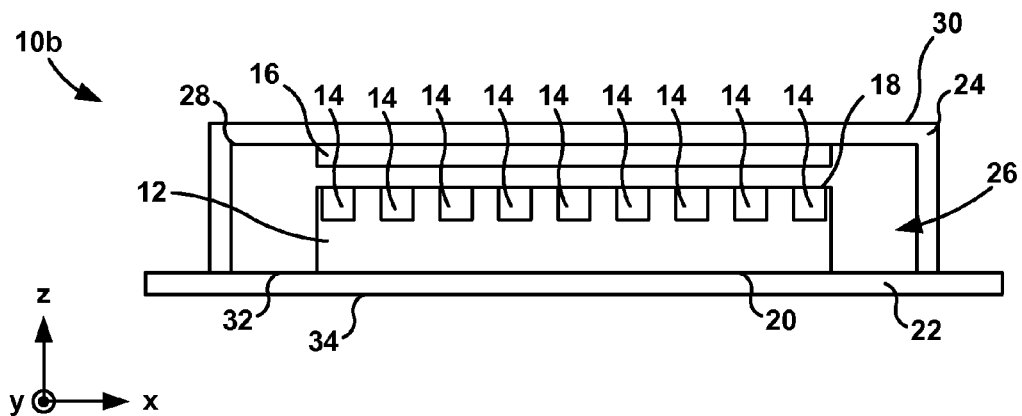
FIG. 12-16 are conceptual and schematic cross-sectional diagrams of example MRAM packages that include a magnetic security structure.

FIG. 11 is a conceptual top view of another example magnetic security structure 16g, which may be an example of magnetic security structure 16 of FIG. 1. In the example shown in FIG. 11, magnetic security structure 16g is discontinuous along at least one direction parallel to the x-y plane shown in FIG. 11, such that the configuration of the magnetic security structure (e.g., the number and arrangement, in the z-axis direction, of permanent magnetic layers, soft magnetic layers, adhesive layers, if any, and spacer layers, if any) may change along a common x-y plane shown in FIG. 11. Magnetic security structure 16g may include a plurality of domains 182, 184, 186, 188, 190, 192, and 194. At least one of domains 182, 184, 186, 188, 190, 192, and 194 may include a structural configuration that includes at least one permanent magnetic layer and at least one soft magnetic layer, e.g., similar to one of the structures described with respect to FIGS. 5-10. At least one of domains 182, 184, 186, 188, 190, 192, 194 may not include a structure configuration that includes at least one permanent magnetic layer and at least one soft magnetic layer. For example, the at least one of domains 182, 184, 186, 188, 190, 192, 194 that does not include at least one permanent magnetic layer and at least one soft magnetic layer may include substantially no material, e.g., may be open to the surface to which magnetic security structure 16g is attached, such as top surface 18 of MRAM die 12 (FIG. 1). As another example, the at least one of domains 182, 184, 186, 188, 190, 192, 194 that does not include at least one permanent magnetic layer and at least one soft magnetic layer may include a spacer material or an adhesive. The spacer material or adhesive may fill the at least one of domains 182, 184, 186, 188, 190, 192, 194 that does not include at least one permanent magnetic layer and at least one soft magnetic layer. In this way, it may not be apparent upon visual inspection that the at least one of domains 182, 184, 186, 188, 190, 192, 194 that does not include at least one permanent magnetic layer and at least one soft magnetic layer is different from any other of domains 182, 184, 186, 188, 190, 192, 194.

FIG. 1 illustrates one example configuration of magnetic security structure 16 relative to MRAM die 12 and MRAM package 10*a*. FIG. 12-16 are conceptual and schematic cross-sectional diagrams that illustrate other example configurations. For example, MRAM package 10*b* illustrated in FIG. 12 includes magnetic security structure 16 attached to interior surface 28 of cover 24. Magnetic security structure 16 may include any of the configurations described herein. In some examples, a permanent magnetic layer of magnetic security structure 16 may be disposed closer to MRAM die 12 than a soft magnetic layer of magnetic security structure 16 (e.g., on a side of magnetic security structure 16 facing top surface 18 of MRAM die). In other examples, a permanent magnetic layer of magnetic security structure 16 may be disposed closer to interior surface 28 of cover 24 than a soft magnetic layer of magnetic security structure 16 (e.g., on a side of magnetic security structure 16 facing interior surface 28 of cover 24). In other examples, a permanent magnetic layer of structure 16 may be disposed closer to MRAM die 12 than a soft magnetic layer of structure 16. In some examples, magnetic security structure 16 may be adhered to interior surface 28 using an adhesive layer (e.g., an adhesive layer similar to adhesive layer 82 shown in FIG. 5).

Figure 13:
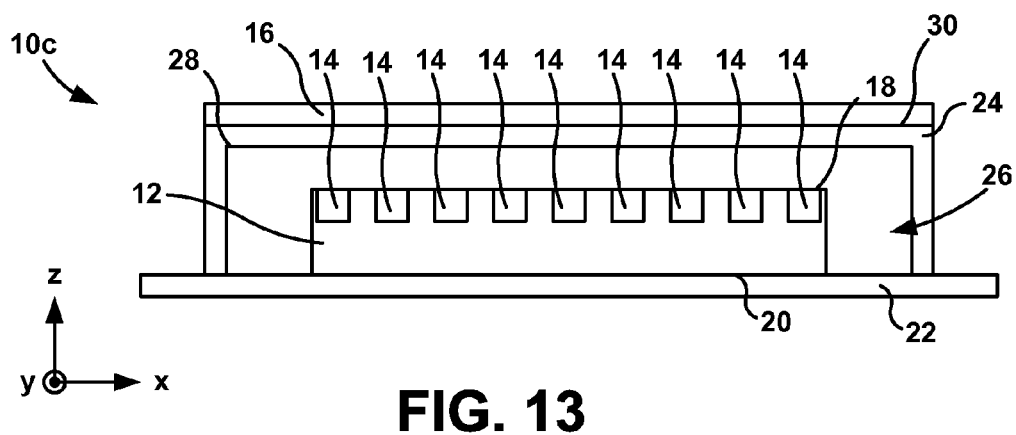

FIG. 13 is a conceptual and schematic cross-sectional diagram that illustrates an example MRAM package 10*c* that includes a magnetic security structure 16 attached to an external surface 30 of cover 24. Magnetic security structure 16 may include any of the configurations described herein. In some examples, a permanent magnetic layer of magnetic security structure 16 may be disposed closer to MRAM die 12 than a soft magnetic layer of magnetic security structure 16 (e.g., on a side of magnetic security structure 16 facing cover 24). In other examples, a permanent magnetic layer of structure 16 may be disposed closer to MRAM die 12 than a soft magnetic layer of structure 16. In some examples, magnetic security structure 16 may be adhered to exterior surface 30 using an adhesive layer (e.g., an adhesive layer similar to adhesive layer 82 shown in FIG. 5).

Figure 14:
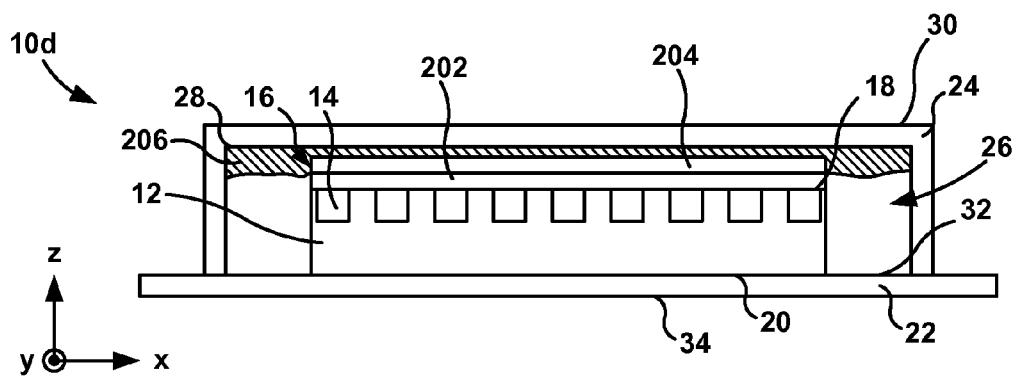

FIG. 14 is a conceptual and schematic cross-sectional diagram that illustrates an example MRAM package 10*d* that includes a magnetic security structure 16 attached to top surface 18 of MRAM die 12. Magnetic security structure 16 includes a permanent magnetic layer 202 adjacent to top surface 18 and a soft magnetic layer 204 disposed on permanent magnetic layer 202 (e.g., on an opposite side of permanent magnetic layer 202 from top surface 18). MRAM package 10*d* may be similar to MRAM package 10*a* shown in FIG. 1. However, in the example shown in FIG. 14, cavity 26 formed by substrate 22 and cover 24 is at least partially filled by a potting material 206. In some examples, potting material 206 may partially fill cavity 26. For example, as shown in FIG. 14, potting material 206 may extend between internal surface 28 of cover 24 and soft magnetic layer 204. In other examples, potting material 206 may substantially (e.g., completely or nearly completely) fill cavity 26, such that nearly all or all space between MRAM die 12 and substrate 22 and cover 24 is occupied by potting material 206.

In some examples, potting material 206 may adhere soft magnetic layer 204 to cover 24, e.g., may adhere soft magnetic layer 204 to internal surface 28 of cover 24. An example of this is shown in FIG. 14. In other examples, potting material 206 may adhere soft magnetic layer 204 to internal surface 32 of substrate 22. Potting material 206 may include, for example, a reactive adhesive, such as an epoxy, acrylic, acrylate, epoxy-acrylate, or urethane reactive adhesive; a heat- or UV-curable adhesive; a thermoplastic adhesive that is applied in a melt form and cooled to solidify; or any combinations thereof. Other types of potting materials may also be used. Adhering soft magnetic layer 204 to one of cover 24 or substrate 22 using potting material 206 may increase a likelihood that soft magnetic layer 204 will be damaged in response to a user physically separating substrate 22 from cover 24, e.g., as part of an attempt to tamper with MRAM die 12.

In some examples, potting material 206 and soft magnetic layer 204 may not be separate materials. For example, potting material 206 may include a polymer or adhesive that is filled with magnetic particles, such that potting material 206 functions as soft magnetic layer 204. Example soft magnetic materials that may be deposited in potting material to provide functionality similar to soft magnetic layer 204 include ferromagnetic metals or alloys, such as, for example, Ni; Fe; Co; or alloys of Ni, Fe, or Co, like NiFe, CoFe, or NiFeCo. In some of these examples, potting material 206 may be attached directly to permanent magnetic material 204.

In other examples, potting material 206, soft magnetic layer 204, and permanent magnetic layer 202 may not be distinct layers. For example, potting material 206 may include a polymer or adhesive, as described above. In some locations, e.g., adjacent to top surface 18 of MRAM die 12, potting material 206 may be filled with a magnetic material that causes potting material 206 to function as permanent magnetic layer 202 at these locations. In other locations, e.g., adjacent to the locations filled with permanent magnetic material, potting material 206 may be filled with a magnetic material that causes potting material 206 to function as soft magnetic layer 204. The particular magnetic material disposed in potting material 206 at the different locations may be selected to provide the desired functionality, e.g., the function of soft magnetic layer 204 and permanent magnetic layer 202, as described herein.

Figure 15:
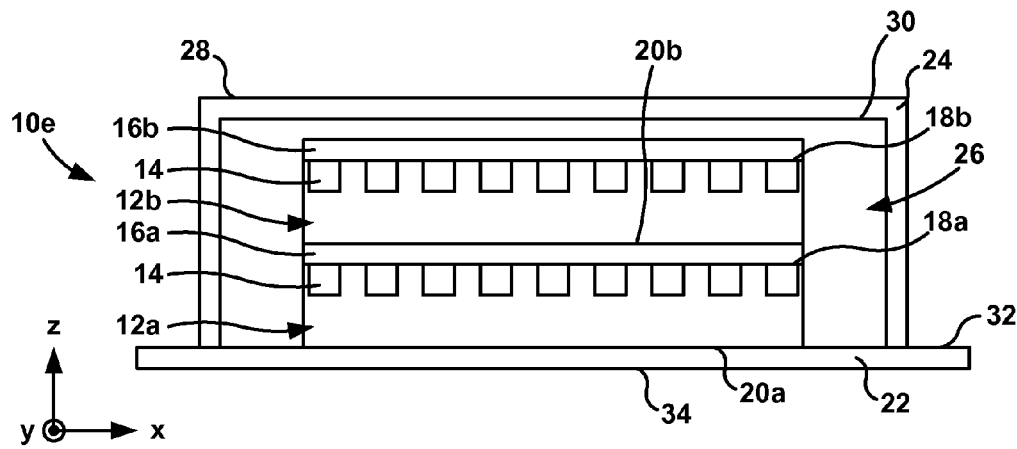

FIG. 15 is a conceptual and schematic cross-sectional diagram that illustrates an example MRAM package 10*e* that includes multiple (e.g., at least two) MRAM dice disposed within the package 10*e*. In the example shown in FIG. 15, a first MRAM die 12*a* and a second MRAM die 12*b* are disposed in cavity 26 of MRAM package 10*e*. However, in other examples, more than two (e.g., at least three) MRAM dice 12 may be disposed in cavity 26. Second MRAM die 12*b* is stacked on first MRAM die 12*a*, such that MRAM dice 12*a*, 12*b* are stacked in a z-axis direction in the example shown in FIG. 15. In other examples, first MRAM die 12*a* may be disposed beside second MRAM die 12*b*, such that MRAM dice 12*a*, 12*b* are aligned in the x-y plane, and both MRAM dice 12*a*, 12*b*, may be directly, mechanically attached to substrate 22. In some examples, MRAM package 12*e* may include multiple MRAM dice 12, and some MRAM dice 12 may be stacked on other MRAM dice 12, while the MRAM dice 12 also may be distributed along substrate 22. In other words, in some examples, MRAM package 10*e* may include multiple stacks of MRAM dice 12, where each stack includes one or more MRAM dice 12.

In the example shown in FIG. 15, MRAM dice 12*a*, 12*b* are substantially the same size (e.g., have the same dimensions or nearly the same dimensions), and are stacked such that the edges of the dice 12*a*, 12*b* are aligned with each other in the x-y, x-z, and y-z planes. In other examples, MRAM dice 12*a*, 12*b* may have different dimensions in at least one of the x-, y-, or z-axis directions, such that when the dice 12*a*, 12*b* are stacked in the z-axis direction, at least one peripheral edge of one die 12a does not line-up with the peripheral edge of the other die 12a.

In the example shown in FIG. 15, first MRAM die 12a is mechanically attached to internal surface 32 of substrate. First MRAM die 12a also may be electrically attached to internal surface 32 (e.g., electrical pads or traces formed on internal surface 32). For example, electrically conductive pads (not shown) on bottom surface 20a of first MRAM die 12a may be soldered to electrically conductive pads (not shown) on internal surface 32 of substrate 22. As another example, bottom surface 20a of first MRAM die 12a may be adhered to internal surface 32.

First magnetic security structure 16a is mechanically attached to top surface 18a of first MRAM die 12a. First magnetic security structure 16a may include any of the configurations described herein. Bottom surface 20b of second MRAM die 12b is mechanically attached to first magnetic security structure 16. In some implementations, bottom surface 20b of second MRAM die 12b may be adhered to first magnetic security structure 16a using, for example, a silicone- or acrylic-based pressure sensitive adhesive; a reactive adhesive, such as an epoxy, acrylic, acrylate, epoxy-acrylate, or urethane reactive adhesive; a heat- or UV-curable adhesive; a thermoplastic adhesive that is applied in a melt form and cooled to solidify; or any combinations thereof. A second magnetic security structure 16b is mechanically attached to top surface 18b of second MRAM die 12b. Second magnetic security structure 16b may include any of the configurations described herein.

In some examples, first and second magnetic security structures 16a, 16b have the same configuration. In other examples, first and second magnetic security structures 16a, 16b have different configurations. In some cases, having different configurations for first and second magnetic security structures 16a and 16b may complicate removal of the magnetic security structures 16a, 16b from the MRAM dice 12a, 12b by increasing a likelihood that an unauthorized user does not know and may have difficulty predicting the configuration of first and second magnetic security structures 16a and 16b. Hence, in some examples, having different configurations for first and second magnetic security structures 16a, 16b may provide greater protection against tampering than magnetic security structures 16a, 16b that have the same configuration.

Figure 16:
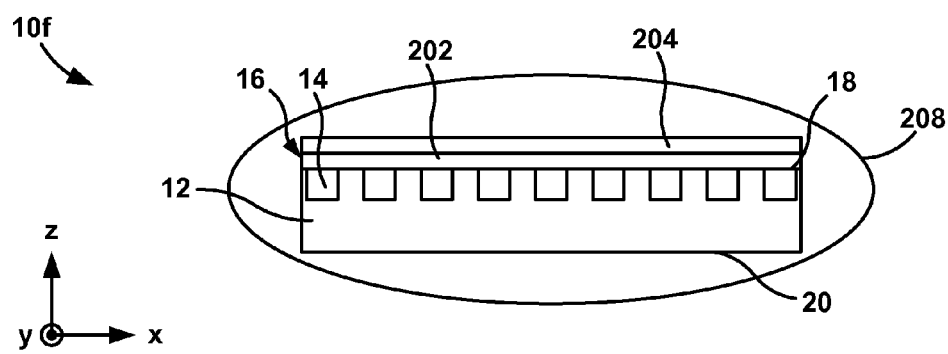

In some examples, instead of being at least partially enclosed in a substrate 22 and cover 24, MRAM die 12 may be enclosed in a potting material without a cover 24 and substrate 22. FIG. 16 is a conceptual and schematic cross-sectional diagram of an example MRAM package 10f that includes an MRAM die 12 at least partially enclosed in a potting material 208. In some examples, MRAM die 12 may be substantially fully (e.g., fully or nearly fully) enclosed by potting material 208. In other examples, MRAM die 12 may be partially enclosed by potting material 208 (e.g., part of MRAM die 12 may not be enclosed by potting material 208). Similar to potting material 206, potting material 208 may include, for example, a reactive adhesive, such as an epoxy, acrylic, acrylate, epoxy-acrylate, or urethane reactive adhesive; a heat- or UV-curable adhesive; a thermoplastic adhesive that is applied in a melt form and cooled to solidify; or any combinations thereof.

Although FIGS. 1 and 12-16 show six example configurations of magnetic security structure 16 relative to MRAM die 12 and MRAM packages 10a-10f, these are not the only examples that fall within the scope of the disclosure. For example, a magnetic security structure 16 may be attached to internal surface 32 and/or external surface 34 of substrate 22. Additionally or alternatively, various examples described herein may be used in combination, e.g., a first magnetic security structure 16 may be attached to a top surface 18 of MRAM die 12 and a second magnetic security structure 16 may be attached to a surface of cover 24 and/or substrate 22. Other examples and combinations will be apparent from the disclosure.

Figure 17:
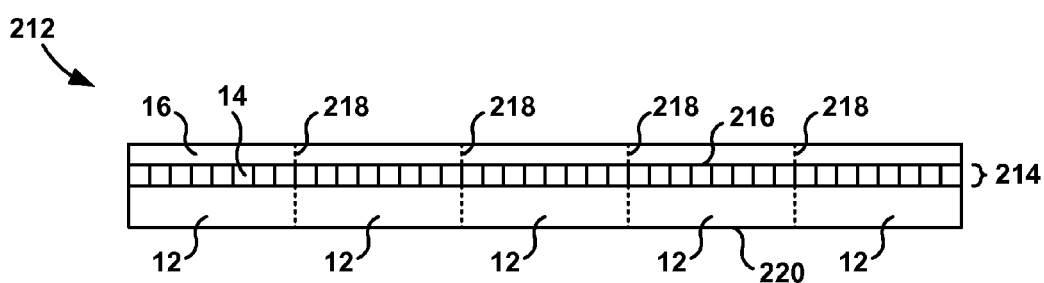
FIG. 17 is a conceptual and schematic cross-sectional diagram of an example semiconductor wafer that includes a plurality of MRAM dice and a magnetic security structure attached to a surface of the semiconductor wafer.
Figure 18:
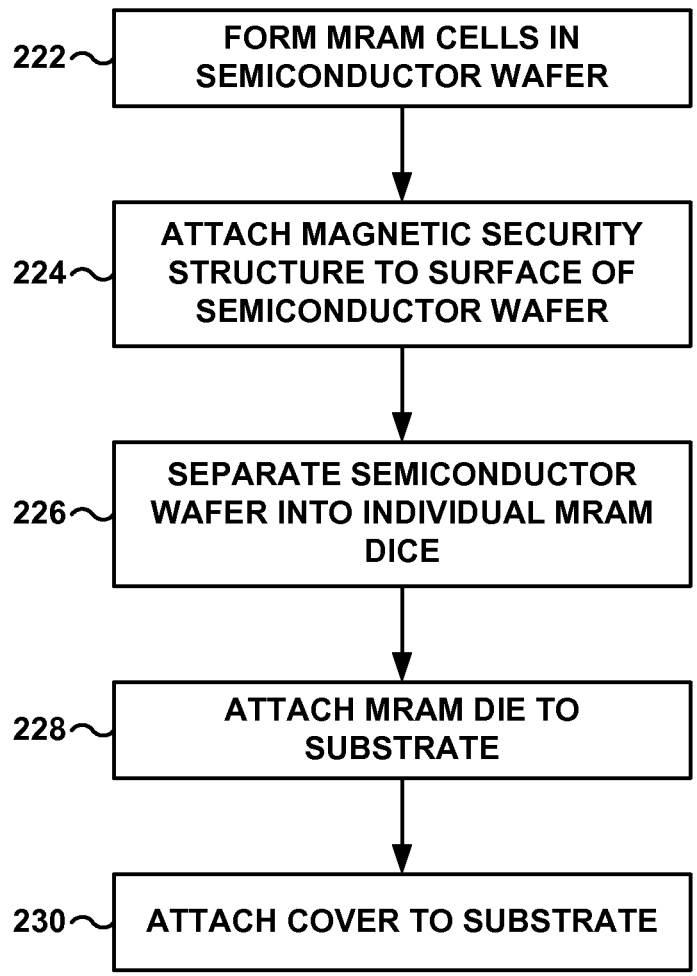
FIG. 18 is a flow diagram that illustrates an example technique for forming a MRAM package that includes an MRAM die and a magnetic security structure attached to the MRAM die.

MRAM packages 10a, 10b, 10c, 10d, 10e, 10f (collectively, "MRAM packages 10") may be formed using a variety of techniques. For example, magnetic security structure 16 may be adhered to exterior surface 30 of cover 24, interior surface 28 of cover 24, and/or top surface 18 of MRAM die 12 during assembly of MRAM packages 10. In other examples, magnetic security structure 16 may be attached to MRAM die 12 while MRAM die 12 is part of a semiconductor wafer (e.g., prior to cutting the wafer into individual die). FIG. 17 is a conceptual diagram of a plurality of MRAM dice 12 in a semiconductor wafer 212. FIG. 18 is a flow diagram that illustrates an example technique of forming an MRAM package 10.

In some examples, MRAM cells 14 may be formed in a semiconductor wafer 212, e.g., using photolithography processes (for forming, e.g., transistors) and/or metal deposition processes (for forming, e.g., write lines, interconnects, and magnetic stack 42) (222). MRAM cells 14 may be formed in a layer 214 of semiconductor wafer 212. Although FIG. 17 illustrates five MRAM dice 12 and eight MRAM cells 14 per MRAM die 12, semiconductor wafer 212 may include tens, hundreds, or thousands of MRAM dice 12 and thousands, millions, or billions of MRAM cells 14 per MRAM die 12.

Semiconductor wafer 212 defines a surface 216 to which magnetic security structure 16 is attached (224). In some examples, as shown in FIG. 17, the surface 216 to which magnetic security structure 16 is attached is adjacent MRAM cells 14. In other examples, magnetic security structure 16 may be attached to surface 220 opposite MRAM cells 14.

As shown in FIG. 17, magnetic security structure 16 may be formed in a layer over the plurality of MRAM dice 12. Magnetic security structure 16 may include a substantially continuous layer or a discontinuous layer (e.g., as shown in FIG. 11). Additionally or alternatively, magnetic security structure 16 may include any of the structural configurations shown in FIGS. 5-11. In some examples, the structural configuration of magnetic security structure 16 is the same for each of MRAM dice 12. In other examples, the structural configuration of magnetic security structure 16 may be different for at least one of MRAM dice 12 that at least one other of MRAM dice 12.

Magnetic security structure 16 may be attached to semiconductor wafer 212 using any one of a variety of means. For example, magnetic security structure 16 may be adhered to surface 216 using an adhesive, e.g., similar to adhesive layer 82 shown in FIG. 5. As another example, magnetic security structure 16 may be formed on surface 216 using a metal deposition process, such as sputtering, CVD, PVD, IBD, or the like.

Once magnetic security structure 16 has been attached to surface 216 of semiconductor wafer 212, semiconductor wafer 212 may be separated into individual MRAM dice 12 (226). For example, semiconductor wafer 212 may be cut along cut lines 218 using a diamond-tipped saw.

An MRAM die 12, which includes an attached magnetic security structure 16 then may be mechanically and/or electrically connected to substrate 22 (FIGS. 1 and 12-15) (228). For example, electrically conductive pads (not shown) on bottom surface 20 of MRAM die 12 may be soldered to electrically conductive pads (not shown) on internal surface 32 of substrate 22. As another example, bottom surface 20 of MRAM die 12 may be adhered to internal surface 32 of substrate 22 using an adhesive and electrically conductive pads (not shown) on top surface 18 of MRAM die 12 may be wire bonded to electrically conductive pads (not shown) on internal surface 32 of substrate 22.

Cover 24 also may be attached to substrate 22 (230). For example, cover 24 may be attached to substrate 22 using soldering, brazing, welding, or the like. In some examples, a hermetic seal is formed between cover 24 and substrate 22, resulting in MRAM die 12 being contained within a hermetic MRAM package (e.g., MRAM package 10a). In other examples, the attachment between cover 24 and substrate 22 may not be hermetic.

In other examples, other techniques may be used to attach magnetic security structure 16 to MRAM die 12. For example, magnetic security structure 16 may be attached to surface 18 of an individual MRAM die 12 (e.g., FIG. 1) after MRAM die 12 has been separated from the semiconductor wafer (e.g., wafer 212). For example, magnetic security structure 16 may be adhered to surface 18 using an adhesive, e.g., similar to adhesive layer 82 shown in FIG. 5. As another example, magnetic security structure 16 may be formed on surface 18 using a metal deposition process, such as sputtering, CVD, PVD, IBD, or the like.

In some examples, magnetic security structures 16 may be attached to an MRAM die 12 (e.g., FIG. 1) both before the MRAM die 12 has been separated from semiconductor wafer 212 and after MRAM die 12 has been separated from semiconductor wafer 212. For example, a first magnetic security structure may be attached to surface 216 of MRAM die 12 before MRAM die 12 is separated from semiconductor wafer 212 (as shown in FIGS. 17 and 18) and a second magnetic security structure may be attached to surface 20 (FIG. 1) of MRAM die 12 after MRAM die 12 has been separated from semiconductor wafer 212. In some examples, attaching magnetic security structures 16 before and after separation of MRAM die 12 from semiconductor wafer 212 may provide opportunity for additional customization of MRAM die 12.

In further examples, magnetic security structure 16 may be attached to inner surface 28 of cover 24 (e.g., FIG. 12), outer surface 30 of cover 24 (e.g., FIG. 13), or both. For example, magnetic security structure 16 may be adhered to inner surface 28, outer surface 30, or both, using an adhesive, e.g., similar to adhesive layer 82 shown in FIG. 5. As another example, magnetic security structure 16 may be formed on inner surface 28, outer surface 30, or both, using a metal deposition process, such as sputtering, CVD, PVD, IBD, or the like.

Various examples have been described. These and other examples are within the scope of the following claims.

What is claimed is:

1. A magnetoresistive random access memory (MRAM) package comprising:
    an MRAM die; and
    a package defining a cavity and an exterior surface, wherein the MRAM die is disposed in the cavity, wherein the package comprises a magnetic security structure that comprises at least three layers including a plurality of permanent magnetic layers and a soft magnetic layer.

2. The MRAM package of claim 1, wherein the plurality of permanent magnetic layers are configured relative to the MRAM die so that the MRAM die is exposed to magnetic flux from the plurality of permanent magnetic layers when the soft magnetic layer is damaged.

3. The MRAM package of claim 1, wherein the soft magnetic layer and the plurality of permanent magnetic layers are configured so the soft magnetic layer channels substantially all magnetic flux from the plurality of permanent magnetic layers when the soft magnetic layer is substantially intact.

4. The MRAM package of claim 1, wherein the magnetic security structure further comprises at least one adhesive layer.

5. The MRAM package of claim 1, wherein the magnetic security structure comprises at least one spacer layer between a permanent magnetic layer of the plurality of permanent magnetic layers and the soft magnetic layer.

6. The MRAM package of claim 1, wherein the soft magnetic layer comprises a plurality of soft magnetic layers.

7. The MRAM package of claim 6, wherein respective ones of the plurality of soft magnetic layers are interleaved with respective ones of the plurality of permanent magnetic layers.

8. The MRAM package of claim 1, wherein the magnetic security structure comprises a first layer configuration at a first location of the magnetic security structure and a second layer configuration at a second location of the magnetic security structure.

9. The MRAM package of claim 1, wherein the magnetic security structure is attached to the outer surface of the package.

10. The MRAM package of claim 1, wherein the package defines an interior surface, and wherein the magnetic security structure is attached to the interior surface of the package.

11. The MRAM package of claim 1, wherein the magnetic security structure is attached to a surface of the MRAM die.

12. A semiconductor wafer that defines a surface, the semiconductor wafer comprising:
    a plurality of magnetoresistive random access memory (MRAM) dice; and
    a magnetic security structure attached to the surface of the semiconductor wafer, wherein the magnetic security structure comprises at least three layers including a plurality of permanent magnetic layers and a soft magnetic layer.

13. The semiconductor wafer of claim 12, wherein the soft magnetic layer and the plurality of permanent magnetic layers are configured so the soft magnetic layer channels substantially all magnetic flux from the plurality of permanent magnetic layers when the soft magnetic layer is substantially intact.

14. The semiconductor wafer of claim 12, wherein the magnetic security structure further comprises at least one adhesive layer.

15. The semiconductor wafer of claim 12, wherein the magnetic security structure comprises at least one spacer layer between a permanent magnetic layer of the plurality of permanent magnetic layers and the soft magnetic layer.

16. The semiconductor wafer of claim 12, wherein the soft magnetic layer comprises a plurality of soft magnetic layers.

17. The semiconductor wafer of claim 12, wherein the magnetic security structure comprises a first layer configuration at a first location of the magnetic security structure and a second layer configuration at a second location of the magnetic security structure.

18. A method comprising:
    forming a plurality of magnetoresistive random access memory (MRAM) dice in a semiconductor wafer, wherein each of the plurality of MRAM dice includes a plurality of MRAM cells; and
    attaching a magnetic security structure to a surface of the semiconductor wafer over the plurality of MRAM dice, wherein the magnetic security structure includes at least three layers including at least one permanent magnetic layer and a plurality of soft magnetic layers.

19. The semiconductor wafer of claim 16, wherein respective ones of the plurality of soft magnetic layers are interleaved with respective ones of the plurality of permanent magnetic layers.

20. The semiconductor wafer of claim 12, wherein the plurality of permanent magnetic layers are configured relative to the plurality of MRAM dice so that the MRAM dice are exposed to magnetic flux from the plurality of permanent magnetic layers when the soft magnetic layer is damaged.

21. A magnetoresistive random access memory (MRAM) package comprising:
    an MRAM die; and
    a package defining a cavity and an exterior surface, wherein the MRAM die is disposed in the cavity, wherein the package comprises a magnetic security structure that comprises at least three layers including a permanent magnetic layer and a plurality of soft magnetic layers.

22. The MRAM package of claim 21, wherein the permanent magnetic layer is configured relative to the MRAM die so that the MRAM die is exposed to magnetic flux from the permanent magnetic layer when at least one soft magnetic layer of the plurality of soft magnetic layers is damaged.

23. The MRAM package of claim 21, wherein the plurality of soft magnetic layers and the permanent magnetic layer are configured so the plurality of soft magnetic layers channel substantially all magnetic flux from the permanent magnetic layer when the plurality of soft magnetic layers are substantially intact.

24. The MRAM package of claim 21, wherein the magnetic security structure comprises a first layer configuration at a first location of the magnetic security structure and a second layer configuration at a second location of the magnetic security structure.

25. The MRAM package of claim 21, wherein the magnetic security structure is attached to at least one of the exterior surface of the package or an interior surface of the package.

26. The MRAM package of claim 21, wherein the magnetic security structure is attached to a surface of the MRAM die.

27. A semiconductor wafer that defines a surface, the semiconductor wafer comprising:
    a plurality of magnetoresistive random access memory (MRAM) dice; and
    a magnetic security structure attached to the surface of the semiconductor wafer, wherein the magnetic security structure comprises at least three layers including a permanent magnetic layer and a plurality of soft magnetic layers.

28. The semiconductor wafer of claim 27, wherein the permanent magnetic layer is configured relative to the plurality of MRAM dice so that the MRAM dice are exposed to magnetic flux from the permanent magnetic layer when at least one soft magnetic layer of the plurality of soft magnetic layers are damaged.

29. The semiconductor wafer of claim 27, wherein the plurality of soft magnetic layers and the permanent magnetic layer are configured so the plurality of soft magnetic layers channel substantially all magnetic flux from the permanent magnetic layer when the plurality of soft magnetic layers is substantially intact.

30. The semiconductor wafer of claim 27, wherein the magnetic security structure comprises a first layer configuration at a first location of the magnetic security structure and a second layer configuration at a second location of the magnetic security structure.

* * * * *